US012617178B2

(12) United States Patent
  Uchiumi et al.

(10) Patent No.:  US 12,617,178 B2
(45) Date of Patent:       May 5, 2026

(54) WATER-STOP FILM

(71) Applicant: FUJIFILM Corporation, Tokyo (JP)

(72) Inventors: Kyohisa Uchiumi, Kanagawa (JP); Ren Ishikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 19/057,927

(22) Filed: Feb. 19, 2025

(65) Prior Publication Data

US 2025/0187296 A1      Jun. 12, 2025

Related U.S. Application Data

(63) Continuation of application No. PCT/JP2023/030520, filed on Aug. 24, 2023.

(30) Foreign Application Priority Data

Aug. 26, 2022    (JP) ................................. 2022-135048

(51) Int. Cl.
  *B32B 3/30*        (2006.01)
  *B32B 3/28*        (2006.01)
  *B32B 5/02*        (2006.01)
  *B32B 27/12*       (2006.01)
  *B32B 27/30*       (2006.01)

(52) U.S. Cl.
  CPC .................. *B32B 3/28* (2013.01); *B32B 3/30* (2013.01); *B32B 5/022* (2013.01); *B32B 27/12* (2013.01); *B32B 27/306* (2013.01); *B32B 2307/726* (2013.01)

(58) Field of Classification Search
  CPC ...... B32B 3/263; B32B 3/30; B32B 2307/726
  See application file for complete search history.

(56) References Cited

U.S. PATENT DOCUMENTS

| 2023/0077419 A1 | 3/2023 | Uchiumi et al. |
| 2023/0302763 A1 | 9/2023 | Uchiumi et al. |

FOREIGN PATENT DOCUMENTS

| JP | S59122308 | 8/1984 |
| JP | H04008610 | 1/1992 |
| JP | 2023037253 | 3/2023 |
| WO | 2022130738 | 6/2022 |

OTHER PUBLICATIONS

"International Search Report (Form PCT/ISA/210) of PCT/JP2023/030520," mailed on Nov. 14, 2023, with English translation thereof, pp. 1-5.
"Written Opinion of the International Searching Authority (Form PCT/ISA/237) of PCT/JP2023/030520," mailed on Nov. 14, 2023, with English translation thereof, pp. 1-8.

*Primary Examiner* — Elizabeth E Mulvaney
(74) *Attorney, Agent, or Firm* — JCIPRNET

(57)          ABSTRACT

Provided is a water-stop film including, in the following order, a water-permeable substrate, a water-absorbent polymer-containing layer, and a pressure-sensitive adhesive layer, in which the water-absorbent polymer-containing layer has a cross-sectional shape in which at least a part of the water-absorbent polymer-containing layer protrudes in a direction away from the water-permeable substrate.

8 Claims, 2 Drawing Sheets

WATER-STOP FILM

CROSS-REFERENCE TO RELATED APPLICATION

This application is a Continuation of International Application No. PCT/JP2023/030520, filed Aug. 24, 2023, which claims priority to Japanese Patent Application No. 2022-135048 filed Aug. 26, 2022. Each of the above applications is hereby expressly incorporated by reference, in its entirety, into the present application.

BACKGROUND OF THE INVENTION

1. Field of the Invention

The present disclosure relates to a water-stop film.

2. Description of the Related Art

In order to reduce damage caused by water infiltration or water leakage, various water stop technologies have been studied.

For example, JP1992-8610B (JP-H4-8610B) discloses a waterproofing device in which a gap of a concrete cast joint of a concrete structure is waterproofed by bonding a waterproofing device consisting of a long synthetic resin tape and a support polymerized thereto, and an adhesive layer is provided on a surface of the synthetic resin tape and bonded to a surface of the concrete cast joint, in which the support is formed of a long synthetic resin foaming material having a trapezoidal cross section, a triangular cross section, or the like, which has a bottom side and two oblique sides, and a nonwoven fabric waterproof tape wider than the bottom side is polymerized on a surface serving as the bottom side.

SUMMARY OF THE INVENTION

As the water stop technology, a method of covering an inlet of water or an outlet of water with a water-stop film has been studied. For example, most of inundation damage of a building occurs due to infiltration of water into the building through a gap of an object such as a window and a door. In order to prevent or reduce the inundation damage as described above, it is considered that covering the gap of the object such as a window and a door with the water-stop film is effective. In construction using the water-stop film, durability is required.

The present disclosure has been made in view of such circumstances, and an object of one embodiment of the present invention is to provide a water-stop film having excellent durability.

The present disclosure includes the following aspects.

<1>
A water-stop film comprising, in the following order:
a water-permeable substrate;
a water-absorbent polymer-containing layer; and
a pressure-sensitive adhesive layer,
in which the water-absorbent polymer-containing layer has a cross-sectional shape in which at least a part of the water-absorbent polymer-containing layer protrudes in a direction away from the water-permeable substrate.

<2>
The water-stop film according to <1>,
in which the water-absorbent polymer-containing layer includes, in the following order, a first water-absorbent polymer-containing layer having a flat shape, on a surface of the water-permeable substrate, and
a second water-absorbent polymer-containing layer having a convex cross-sectional shape, on a surface of the first water-absorbent polymer-containing layer.

<3>
The water-stop film according to <2>,
in which an expansion rate of the second water-absorbent polymer-containing layer is higher than an expansion rate of the first water-absorbent polymer-containing layer.

<4>
The water-stop film according to <3>,
in which the expansion rate of the second water-absorbent polymer-containing layer is 1.5 times to 5 times the expansion rate of the first water-absorbent polymer-containing layer.

<5>
The water-stop film according to any one of <1> to <4>,
in which the cross-sectional shape of the water-absorbent polymer-containing layer is a tapered shape in which a width decreases in the direction away from the water-permeable substrate.

<6>
The water-stop film according to any one of <1> to <5>,
in which an elongation rate of the water-permeable substrate is 100% to 300%.

<7>
The water-stop film according to any one of <1> to <6>,
in which a basis weight of the water-permeable substrate is 100 $g/m^2$ to 200 $g/m^2$.

<8>
The water-stop film according to any one of <1> to <7>,
in which the water-permeable substrate is a nonwoven fabric, a cloth, or a paper.
According to the present disclosure, a water-stop film having excellent durability is provided.

DESCRIPTION OF THE PREFERRED EMBODIMENTS

Figure 1:
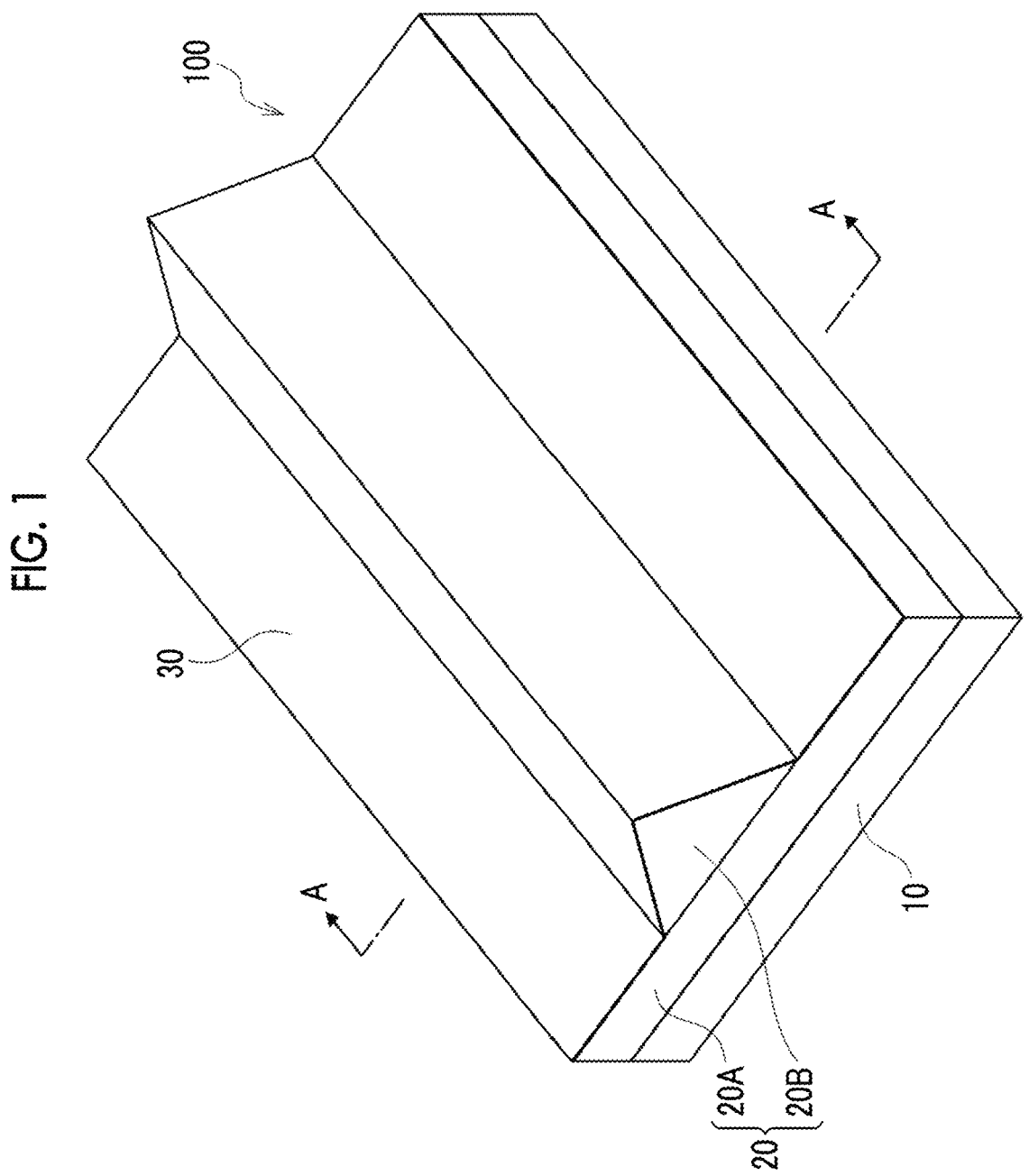
FIG. 1 is a schematic perspective view showing a configuration of a water-stop film according to an embodiment of the present disclosure.

Hereinafter, the water-stop film according to the present disclosure will be described in detail.

The numerical ranges shown using "to" in the present disclosure indicate ranges including the numerical values described before and after "to" as the lower limits and the upper limits.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

Each element in each drawing shown in the present disclosure is not necessarily an accurate scale, the main purpose is to clearly show the principle of the present disclosure, and some parts may be emphasized. In addition, constituent elements indicated by the same reference numeral in each drawing mean the same constituent element.

[Water-Stop Film]

The water-stop film according to the present disclosure includes, in the following order, a water-permeable substrate, a water-absorbent polymer-containing layer, and a pressure-sensitive adhesive layer, in which the water-absorbent polymer-containing layer has a cross-sectional shape in which at least a part of the water-absorbent polymer-containing layer protrudes in a direction away from the water-permeable substrate. By covering a gap of an object with the water-stop film according to the present disclosure, it is possible to stop water in a case where water has entered the gap.

In the film according to the present disclosure, since the water-absorbent polymer-containing layer has a cross-sectional shape in which at least a part of the water-absorbent polymer-containing layer protrudes in a direction away from the water-permeable substrate, the protruding portion can be inserted into a gap of an object. In addition, in a case where water permeates the water-permeable substrate and flows into the water-absorbent polymer-containing layer through the water-permeable substrate, the water-absorbent polymer-containing layer swells. Since the water-absorbent polymer-containing layer swells, the water-stop film can be disposed to fill the gap. As a result, in a case where the water-stop film according to the present disclosure is used, it is possible to stop water for a long time. That is, the water-stop film according to the present disclosure has excellent durability.

On the other hand, in JP1992-8610B (JP-H4-8610B), there is no disclosure regarding the water-absorbent polymer-containing layer, and it is considered that the durability is insufficient.

Hereinafter, an embodiment of the water-stop film according to the present disclosure will be described with reference to the drawings.

Figures 2, 3A, 3B, 3C, 3D:
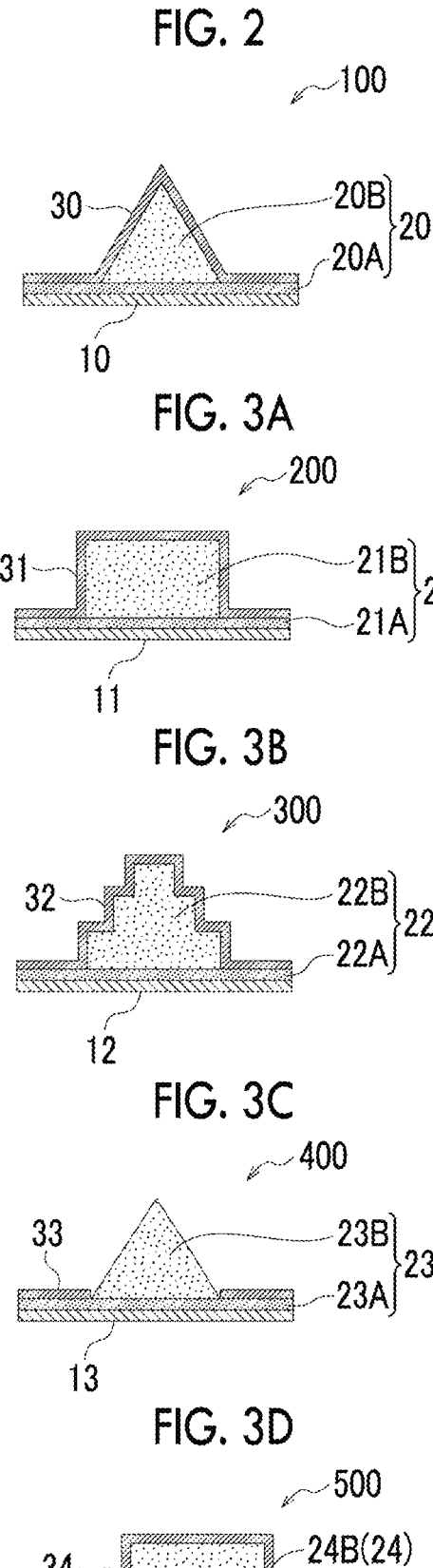
FIG. 2 is a cross-sectional view taken along a line A-A in FIG. 1.
FIG. 3A is a schematic cross-sectional view showing a configuration of Modification example 1 of the water-stop film.
FIG. 3B is a schematic cross-sectional view showing a configuration of Modification example 2 of the water-stop film.
FIG. 3C is a schematic cross-sectional view showing a configuration of Modification example 3 of the water-stop film.
FIG. 3D is a schematic cross-sectional view showing a configuration of Modification example 4 of the water-stop film.

FIG. 1 is a schematic perspective view showing a configuration of the water-stop film according to the embodiment of the present disclosure. FIG. 2 is a cross-sectional view taken along a line A-A in FIG. 1.

As shown in FIG. 2, a water-stop film 100 according to the embodiment of the present disclosure includes a water-permeable substrate 10, a water-absorbent polymer-containing layer 20, and a pressure-sensitive adhesive layer 30 in this order.

The water-stop film 100 is used, for example, to prevent inundation damage to a building. For example, in a state in which a window and a door are closed, a gap between the window and a window frame, a gap between the door and a door frame, a gap between the doors, and the like are attached to be covered with the water-stop film. The water-stop film 100 may be attached from an inflow side of water or may be attached from an outflow side of water.

(Water-Permeable Substrate)

The water-permeable substrate is not particularly limited as long as it is a substrate having water permeability.

In the present disclosure, the "water permeability" means a property in which a liquid water can pass through. Specifically, the water-permeable substrate preferably has a hole through which water can pass.

In the water-stop film, the water-permeable substrate has a role of holding the water-absorbent polymer-containing layer. In addition, in a case where water passes through the water-permeable substrate and enters the water-absorbent polymer-containing layer, the water-absorbent polymer-containing layer swells. The water-permeable substrate also has a role of efficiently bringing the water into contact with the water-absorbent polymer-containing layer.

From the viewpoint of the water permeability, the water-permeable substrate is preferably a layer containing fibers, and more preferably a layer containing cellulose fibers, rayon fibers, polyolefin fibers, or polyester fibers.

From the viewpoint of the water permeability, the water-permeable substrate is preferably a nonwoven fabric, a cloth, or a paper, and more preferably a nonwoven fabric.

The water-permeable substrate is preferably elongated, and a length and a width thereof are not particularly limited. The length means a length of the water-permeable substrate in a longitudinal direction, and the width means a length of the water-permeable substrate in a direction orthogonal to the longitudinal direction.

In the water-permeable substrate, it is preferable that the water is efficiently brought into contact with the water-absorbent polymer-containing layer to swell the water-absorbent polymer-containing layer. In a case where the water-absorbent polymer-containing layer swells, the water-stop film is disposed to fill a gap through which the water flows in, and thus the water can be stopped in a shorter time.

From the viewpoint of efficiently bringing water into contact with the water-absorbent polymer-containing layer, a basis weight of the water-permeable substrate is preferably $250 \text{ g/m}^2$ or less, more preferably $200 \text{ g/m}^2$ or less, and still more preferably $150 \text{ g/m}^2$ or less. From the viewpoint of workability, the basis weight of the water-permeable substrate is preferably $60 \text{ g/m}^2$ or more, and more preferably $100 \text{ g/m}^2$ or more. The basis weight of the water-permeable substrate is preferably in a range of $60 \text{ g/m}^2$ or more and $250 \text{ g/m}^2$ or less.

The basis weight is a mass per unit area. In the present disclosure, the basis weight is measured by the following method.

A test piece having a width of 50 mm and a length of 500 mm is obtained from the water-permeable substrate. A mass (g) of the test piece is measured. The mass is converted into a mass (g) per $1 \text{ m}^2$ and defined as the basis weight.

In addition, from the viewpoint of more closely attaching the water-stop film to a periphery of the gap of the object, an elongation rate of the water-permeable substrate is prefer-ably 100% to 300% and more preferably 100% to 150%. In particular, in a case where there is a step or the like at the periphery of the gap of the object, the water-stop film can be disposed to follow a shape of the periphery of the gap of the object, and the durability is improved in a case where the elongation rate of the water-permeable substrate is within the above-described range.

In the present disclosure, the elongation rate is measured by the following method.

In the water-permeable substrate having a width of 50 mm, a load of 1.5 kg is applied in a length direction. The elongation rate is calculated from the following expression based on a length T0 of the water-permeable substrate before the load is applied and the length T1 of the water-permeable substrate after the load is applied.

$$\text{Elongation rate (\%)} = \{(T1 - T0)/T0\} \times 100$$

A thickness of the water-permeable substrate is not par-ticularly limited, and is, for example, 15 μm to 200 μm.

In the present disclosure, the thickness is represented by an arithmetic average of thicknesses measured at five loca-tions.

(Water-Absorbent Polymer-Containing Layer)

The water-absorbent polymer-containing layer 20 is a layer containing a water-absorbent polymer, which is pro-vided on the water-permeable substrate 10. As shown in FIG. 1, the water-absorbent polymer-containing layer 20 has a cross-sectional shape in which at least a part of the water-absorbent polymer-containing layer 20 protrudes in a direction away from the water-permeable substrate.

The water-absorbent polymer-containing layer 20 swells in a case of absorbing water, and the swelling water-absorbent polymer-containing layer closes the gap of the object, thereby stopping water. Since the water-absorbent polymer-containing layer 20 has a cross-sectional shape in which at least a part thereof protrudes in a direction away from the water-permeable substrate, the water-stop film can be inserted into the gap. Adhesiveness between the object and the water-stop film is high, and thus the durability is excellent.

It is sufficient that the water-absorbent polymer-contain-ing layer is provided on the water-permeable substrate, and another layer may be provided between the water-permeable substrate and the water-absorbent polymer-containing layer; but from the viewpoint of efficiently moving water from the water-permeable substrate to the water-absorbent polymer-containing layer, it is preferable that the water-absorbent polymer-containing layer is provided on the surface of the water-permeable substrate.

It is sufficient that the water-absorbent polymer-contain-ing layer has a cross-sectional shape in which at least a part thereof protrudes in a direction away from the water-per-meable substrate, and a specific shape thereof is not par-ticularly limited. For example, as shown in FIG. 2, a part of the cross-sectional shape of the water-absorbent polymer-containing layer 20 has a triangular shape.

Among these, from the viewpoint of workability, it is preferable that the cross-sectional shape of the water-absor-bent polymer-containing layer is a tapered shape in which a width decreases in the direction away from the water-permeable substrate. The reduction in width may be con-tinuous or discontinuous. A portion where the width does not change in the direction away from the water-permeable substrate may be included. As shown in FIG. 2, the water-absorbent polymer-containing layer 20 has a triangular shape in cross section, which continuously decreases in width in the direction away from the water-permeable sub-strate.

In addition, as shown in FIG. 2, the water-absorbent polymer-containing layer 20 includes a first water-absorbent polymer-containing layer 20A having a flat shape, on a surface of the water-permeable substrate 10, and includes a second water-absorbent polymer-containing layer 20B hav-ing a convex cross-sectional shape, on a surface of the first water-absorbent polymer-containing layer 20A in this order.

The "flat shape" means that the surface has a flat surface portion with few uneven portions. Specifically, a surface roughness Ra of the first water-absorbent polymer-contain-ing layer is preferably 1 μm or less.

The "convex shape" means a shape protruding from a reference surface (here, the surface of the first water-absor-bent polymer-containing layer). In the present disclosure, in a case where a distance from the surface of the first water-absorbent polymer-containing layer to a surface of the protruding portion of the second water-absorbent polymer-containing layer farthest from the surface of the first water-absorbent polymer-containing layer is 5 mm or more, the cross-sectional shape of the second water-absorbent poly-mer-containing layer is the convex shape.

The water-absorbent polymer-containing layer may be only the second water-absorbent polymer-containing layer having a convex cross-sectional shape, but in a case where the first water-absorbent polymer-containing layer having a flat shape is provided, the workability is improved and the durability is improved. In particular, the water-absorbent polymer-containing layer is effective in a case where there is a step or the like at the periphery of the gap of the object.

Both the first water-absorbent polymer-containing layer and the second water-absorbent polymer-containing layer swell by coming into contact with water, but it is preferable that an expansion rate of the second water-absorbent poly-mer-containing layer is higher than an expansion rate of the first water-absorbent polymer-containing layer. The second water-absorbent polymer-containing layer can fill the gap of the object and stop water in a short time by swelling more quickly by the contact with the water. On the other hand, since the first water-absorbent polymer-containing layer has a smaller expansion rate than the second water-absorbent polymer-containing layer, the adhesiveness to the periphery of the gap of the object can be enhanced.

In the present disclosure, the expansion rate is measured by the following method.

The water-absorbent polymer-containing layer is cut out from the water-stop film to obtain a test piece. A mass of the obtained test piece is measured. The test piece is immersed in water, and the mass of the test piece is measured 1,200 seconds later. The expansion rate is calculated from the following expression.

$$\text{Expansion rate (g/sec)} =$$
$$(\text{Mass after immersion} - \text{Mass before immersion})/\text{Immersion time}$$

From the viewpoint of further improving the durability of the water-stop film, the expansion rate of the second water-absorbent polymer-containing layer is preferably 1.5 times to 5 times and more preferably 1.5 times to 3 times the expansion rate of the first water-absorbent polymer-containing layer.

A length and a width of the water-absorbent polymer-containing layer are not particularly limited, and the water-absorbent polymer-containing layer may be disposed to cover a part of the surface of the water-permeable substrate; but from the viewpoint of stop water in a shorter time, the water-absorbent polymer-containing layer is preferably disposed to completely cover the water-permeable substrate.

In a case where the water-absorbent polymer-containing layer includes the first water-absorbent polymer-containing layer and the second water-absorbent polymer-containing layer, it is preferable that the first water-absorbent polymer-containing layer is disposed to cover the entire surface of the water-permeable substrate. A thickness of the first water-absorbent polymer-containing layer is not particularly limited, but is preferably 5 mm or less, more preferably 3 mm or less, and still more preferably 2 mm or less. As the thickness of the first water-absorbent polymer-containing layer is larger, it is easier to follow the peripheral shape of the gap of the object, it is possible to stop water faster, and it easier is to perform construction. From the viewpoint of strength, the lower limit value of the thickness of the first water-absorbent polymer-containing layer is, for example, 1 mm.

It is preferable that the second water-absorbent polymer-containing layer is disposed only on a part of the surface of the first water-absorbent polymer-containing layer such that the cross-sectional shape is a convex shape. A width of a portion where the first water-absorbent polymer-containing layer and the second water-absorbent polymer-containing layer are in contact with each other can be appropriately adjusted, and is, for example, 5 mm to 50 mm. A thickness of the second water-absorbent polymer-containing layer is not particularly limited, but from the viewpoint of workability, it is preferably 5 mm to 30 mm.

In FIG. 2, an interface between the water-permeable substrate 10 and the water-absorbent polymer-containing layer 20 is clear, but in practice, a part of the water-absorbent polymer-containing layer 20 may permeate into the water-permeable substrate 10, and thus the interface may be unclear.

Here, the aspect in which a part of the water-absorbent polymer-containing layer has permeated into the water-permeable substrate means an aspect in which the water-absorbent polymer-containing layer has entered the water-permeable substrate. In other words, a mixed region where a part of the water-absorbent polymer-containing layer is mixed is formed in the water-permeable substrate. For example, in a case where a nonwoven fabric is used as the water-permeable substrate, a part of the water-absorbent polymer is impregnated from the surface of the nonwoven fabric, and the gap between the fibers of the nonwoven fabric is filled with the water-absorbent polymer. The thickness of the water-permeable substrate is a thickness including the mixed region. In addition, the thickness of the water-absorbent polymer-containing layer is a thickness which does not include the mixed region.

A water-absorbent polymer contained in the water-absorbent polymer-containing layer is not particularly limited as long as it is a polymer having a function of swelling in a case of coming into contact with water, and a generally known water-absorbent polymer can be used.

The "water absorbency" means that a water absorption rate measured in accordance with a method A described in JIS K 7209: 2000 (ISO 62: 1999) is 12% or more. The water absorption rate is a percentage of a change in mass with respect to an initial mass. The water absorption rate is preferably 15% or more, and more preferably 20% or more. From the viewpoint of durability, the upper limit of the water absorption rate is preferably 60% or less, and more preferably 50% or less.

Examples of the water-absorbent polymer include a (meth)acrylic polymer, a vinyl polymer, polyurethane, and polysaccharides. In addition, examples of the water-absorbent polymer also include hydrophilic polyester, gelatin, a starch/sodium acrylate graft copolymer, and an isobutylene/maleic acid anhydride copolymer.

From the viewpoint of water stopping properties, the water-absorbent polymer preferably includes at least one polymer selected from the group consisting of a (meth)acrylic polymer, a vinyl-based polymer, polyurethane, and polysaccharides; and more preferably includes at least one polymer selected from the group consisting of a (meth)acrylic polymer and polyurethane.

In particular, in a case where the water-absorbent polymer-containing layer includes the first water-absorbent polymer-containing layer and the second d water-absorbent polymer-containing layer, a water-absorbent polymer contained in the first water-absorbent polymer-containing layer preferably includes an acrylic acid/sodium acrylate copolymer; and a water-absorbent polymer contained in the second water-absorbent polymer-containing layer preferably includes a (meth)acrylic polymer or polyurethane and more preferably includes polyurethane. Furthermore, it is preferable that the water-absorbent polymer contained in the first water-absorbent polymer-containing layer includes an acrylic acid/sodium acrylate copolymer, and the water-absorbent polymer contained in the second water-absorbent polymer-containing layer includes a (meth)acrylic polymer or polyurethane.

The (meth)acrylic polymer means a polymer containing a constitutional unit derived from a monomer having a (meth)acryloyl group. The (meth)acrylic polymer may be either a homopolymer or a copolymer.

Examples of the monomer having a (meth)acryloyl group include (meth)acrylic acid, (meth)acrylamide, and a (meth)acrylic acid ester.

Examples of the (meth)acrylamide include acrylamide, methacrylamide, N-methylacrylamide, N,N'-dimethylacrylamide, N,N'-dimethylmethacrylamide, and N-methylolacrylamide.

The (meth)acrylic acid ester is preferably a (meth)acrylic acid alkyl ester, and more preferably a (meth)acrylic acid alkyl ester having 1 to 4 carbon atoms in an alkyl moiety. Examples of the (meth)acrylic acid alkyl ester include methyl (meth)acrylate, ethyl (meth)acrylate, butyl (meth)acrylate, and isobutyl (meth)acrylate.

Examples of the (meth)acrylic polymer include polyacrylic acid, polymethacrylic acid, a polyacrylic acid salt, a crosslinked substance of polyacrylic acid, a crosslinked substance of a polyacrylic acid salt, an acrylic acid/acrylic acid salt copolymer, polyacrylamide, polymethacrylamide, an acrylamide-acrylic acid copolymer, an acrylamide/methacrylic acid copolymer, an acrylamide-methyl methacrylate copolymer, an acrylamide/methyl methacrylate copolymer, an N,N'-dimethylacrylamide/N-methylolacrylamide/methyl methacrylate copolymer, polymethyl (meth)acrylate, polyethyl (meth)acrylate, polybutyl (meth)acrylate, and polyisobutyl (meth)acrylate.

A weight-average molecular weight of the (meth)acrylic polymer is preferably 100,000 to 10,000,000, more preferably 250,000 to 5,000,000, and still more preferably 500,000 to 2,500,000.

In the present disclosure, the weight-average molecular weight (Mw) means a value measured by gel permeation chromatography (GPC). In the measurement by gel permeation chromatography (GPC), HLC (registered trade name)-8020 GPC (manufactured by TOSOH CORPORATION) is used as a measuring device, three columns of TSKgel (registered trade name) Super Multipore HZ-H (4.6 mm ID×15 cm, manufactured by TOSOH CORPORATION) are used as columns, and tetrahydrofuran (THF), N-methylpyrrolidone (NMP), dimethylformamide (DMF), or water is used as an eluent. In addition, the measurement is performed under measurement conditions of a sample concentration of 0.45% by mass, a flow rate of 0.35 ml/min, a sample injection volume of 10 μl, and a measurement temperature of 40° C. using an RI detector. A calibration curve is created using 8 samples of "F-40", "F-20", "F-4", "F-1", "A-5000", "A-2500", "A-1000", and "n-propylbenzene" which are "Standard Samples TSK standard, polystyrene" (manufactured by TOSOH Corporation).

The vinyl-based polymer means a polymer containing a constitutional unit derived from a monomer having a vinyl group. The vinyl-based polymer may be either a homopolymer or a copolymer.

Examples of the monomer having a vinyl group include vinyl acetate, vinylpyrrolidone, and vinyl methyl ether.

Examples of the vinyl-based polymer include polyvinyl alcohol, polyvinylpyrrolidone, polyvinylpolypyrrolidone, and polyvinyl methyl ether.

The polyurethane may be selected from known polyurethane having water absorbency. Examples of the polyurethane include a polyurethane obtained by reacting an active hydrogen-containing compound with an isocyanate. Preferred examples of the polyurethane include a polyurethane obtained by reacting a polyalkylene oxide with a diol having a molecular weight of 500 or less and a diisocyanate. The polyalkylene oxide and the diisocyanate contribute to formation of a soft segment. The diol having a molecular weight of 500 or less and the diisocyanate contribute to formation of a hard segment.

Examples of the active hydrogen-containing compound include a compound having a hydroxy group. Examples of the compound having a hydroxy group include polyalkylene oxide and a low-molecular-weight diol. One or two or more kinds of the active hydrogen-containing compounds may be used.

Examples of the polyalkylene oxide include polyethylene oxide and polypropylene oxide. The polyalkylene oxide preferably includes polyethylene oxide. The polyalkylene oxide is preferably at least one selected from the group consisting of polyethylene oxide and polypropylene oxide, and more preferably polyethylene oxide. One kind or two or more kinds of the polyalkylene oxides may be used. The polyalkylene oxide may be polyethylene oxide or polypropylene oxide.

In a case where polyethylene oxide and polypropylene oxide are used in combination, a ratio of the total mass of the polypropylene oxide to the total mass of the polyethylene oxide (that is, [Total mass of polypropylene oxide]/[Total mass of polyethylene oxide]) is preferably 0.10 to 0.35, more preferably 0.15 to 0.30, and still more preferably 0.15 to 0.25.

A weight-average molecular weight of the polyalkylene oxide is preferably 3,000 to 100,000, more preferably 3,000 to 80,000, and still more preferably 3,000 to 60,000.

A weight-average molecular weight of the polyethylene oxide is preferably 10,000 to 100,000, more preferably 20,000 to 80,000, and still more preferably 30,000 to 60,000.

A weight-average molecular weight of the polypropylene oxide is preferably 3,000 to 50,000, more preferably 3,000 to 30,000, and still more preferably 3,000 to 10,000.

Examples of the low-molecular-weight diol include a diol having a molecular weight of 500 or less. The lower limit of the molecular weight of the diol may be 62. Examples of the low-molecular-weight diol include ethylene glycol, diethylene glycol, triethylene glycol, tetraethylene glycol, propylene glycol, dipropylene glycol, trimethylene glycol, 1,3-butanediol, 2,3-butanediol, 1,4-butanediol, 1,5-pentanediol, hexylene glycol, octylene glycol, glyceryl monoacetate, glyceryl monobutyrate, 1,6-hexanediol, and 1,9-nonanediol. The low-molecular-weight diol is preferably 1,4-butanediol. One or two or more kinds of the low-molecular-weight diols may be used.

Examples of the isocyanate include a diisocyanate. Examples of the diisocyanate include an aliphatic diisocyanate and an aromatic diisocyanate. Specific examples of the diisocyanate include 4,4'-diphenylmethane diisocyanate, 1,6-hexamethylene diisocyanate, 1,8-dimethylbenzol-2,4-diisocyanate, 2,4-tolylene diisocyanate, 2,2'-dimethyl-4,4'-diphenylmethane diisocyanate, 1,3-bis(isocyanatomethyl) benzene, 1,4-bis(isocyanatomethyl)benzene, 1,3-bis (isocyanatomethyl)cyclohexane, 1,4-bis(isocyanatomethyl) cyclohexane, 4,4'-dicyclohexylmethane diisocyanate, and isophorone diisocyanate. The diisocyanate is preferably 4,4'-diphenylmethane diisocyanate. One kind or two or more kinds of the isocyanates may be used.

The polyurethane may be a commercially available product. Examples of the commercially available product include a highly water-absorbent thermoplastic polyurethane elastomer (trade name: Elastollan BO38) manufactured by BASF SE and a hydrophilic polyurethane (trade name: AQUA CALK C, AQUA CALK TWB, and AQUA CALK TWB-P) manufactured by SUMITOMO SEIKA CHEMICALS CO., LTD.

Examples of the polysaccharides include an alginic acid salt, xanthan gum, gellan gum, tragacanth gum, karaya gum, Arabic gum, carrageenan, dextrin, agar, pectin, pullulan, locust bean gum, sacran, tamarind seed gum, hydroxyethyl cellulose, hydroxypropyl cellulose, carboxymethyl cellulose, carboxymethylethyl cellulose, a hydroxypropyl cellulose salt, a carboxymethyl cellulose salt, a carboxymethyl ethyl cellulose salt, a cellulose nanofiber (Tempo-oxidated cellulose nanofiber, carboxymethylated cellulose nanofiber, phosphoric acid esterified cellulose nanofiber, or cellulose nanofiber by mechanical defibration), chitosan nanofiber, cellulose microfibril, a hyaluronic acid salt, and hyaluronic acid.

The water-absorbent polymer-containing layer can be formed, for example, by charging a composition for a water-absorbent polymer-containing layer, containing the water-absorbent polymer, into a mold having a convex cross-sectional shape, and drying the composition.

In addition to the water-absorbent polymer, the composition for a water-absorbent polymer-containing layer may contain a component such as a solvent, an ultraviolet absorbing agent, an antioxidant, a crosslinking agent, a surfactant, a filler, a coloring agent, a light stabilizer, a viscosity improver, and a polymerization initiator.

(Pressure-Sensitive Adhesive Layer)

The pressure-sensitive adhesive layer is a layer having a pressure-sensitive adhesive function. The pressure-sensitive adhesive layer preferably contains at least one pressure-sensitive adhesive component. Examples of the pressure-sensitive adhesive component include a silicone resin, an acrylic resin, a vinyl resin, polyurethane, polyamide, polyester, polyolefin, and rubber.

In the present disclosure, the "pressure-sensitive adhesiveness" means that a material adheres to a member (for example, glass) and is capable of being peeled therefrom, and it is distinguished from "adhesion".

Examples of the silicone resin include an addition reaction-type silicone resin, a peroxide curing-type silicone resin, and a condensation-type silicone resin.

Examples of the acrylic resin include a homopolymer of an acrylic acid ester compound and a copolymer of an acrylic acid ester compound and other monomers.

Examples of the acrylic acid ester compound include methyl (meth)acrylate, ethyl (meth)acrylate, butyl (meth)acrylate, 2-ethylhexyl (meth)acrylate, hydroxyethyl methacrylate, hydroxypropyl methacrylate, dimethylaminoethyl methacrylate, and glycidyl methacrylate. Examples of the other monomers include vinyl acetate, (meth)acrylonitrile, (meth)acrylamide, styrene, methacrylic acid, acrylic acid, itaconic acid, methylol acrylamide, and maleic acid anhydride.

Examples of the vinyl resin include polyvinyl alcohol and polyvinylpyrrolidone.

Examples of the polyurethane include polyester polyurethane and polycarbonate polyurethane.

Examples of the polyamide include a polyamide (an amide 11) obtained by ring-opening polycondensation of undecane lactam and a polyamide (an amide 12) obtained by ring-opening polycondensation of laurolactam.

Examples of the polyester include a condensation polymer of a polyvalent carboxylic acid and a polyhydric alcohol, and specific examples thereof include polyethylene terephthalate and polybutylene terephthalate.

Examples of the polyolefin include a homopolymer of an olefin and a copolymer of an olefin and other monomers. The olefin is preferably an olefin having 2 to 6 carbon atoms, and examples thereof include ethylene, propylene, butene, methyl pentene, and hexene. Examples of the copolymer of the olefin and the other monomers include an ethylene-vinyl acetate copolymer resin (EVA), an ethylene-acrylic acid copolymer (EAA), an ethylene-ethyl acrylate copolymer (EEA), and an ethylene-methyl methacrylate copolymer (EMMA).

Examples of the rubber include a styrene/butadiene copolymer (Styrene-Butadiene Rubber (SBR) and Styrene-Butadiene-Styrene (SBS)), a styrene/isoprene copolymer (Styrene-Isoprene-Styrene (SIS)), an acrylonitrile/butadiene copolymer (Nitrile-Butadiene Rubber (NBR)), a chloroprene polymer, and an isobutylene/isoprene copolymer (butyl rubber).

The pressure-sensitive adhesive layer can be formed, for example, by applying a composition for a pressure-sensitive adhesive layer, containing the pressure-sensitive adhesive component, onto the water-absorbent polymer-containing layer, and drying the composition. In addition to the pressure-sensitive adhesive component, the composition for a pressure-sensitive adhesive layer may contain a component such as a solvent, an ultraviolet absorbing agent, an antioxidant, a crosslinking agent, a surfactant, a filler, a coloring agent, a light stabilizer, a viscosity improver, and a polymerization initiator.

In addition, the pressure-sensitive adhesive layer may be a pressure-sensitive adhesive body obtained by peeling off a peeling liner of a commercially available double-sided pressure-sensitive adhesive sheet or double-sided pressure-sensitive adhesive tape. The pressure-sensitive adhesive layer can be formed by attaching, onto the water-absorbent polymer-containing layer, the pressure-sensitive adhesive body obtained by peeling off a peeling liner of a commercially available double-sided pressure-sensitive adhesive sheet or double-sided pressure-sensitive adhesive tape.

In addition, for example, the composition for a pressure-sensitive adhesive layer, containing the pressure-sensitive adhesive component, may be charged into a mold having a convex cross-sectional shape, and the pressure-sensitive adhesive layer may be molded into a convex shape. By pouring the composition for a water-absorbent polymer-containing layer, containing the water-absorbent polymer, onto the molded pressure-sensitive adhesive layer, the water-absorbent polymer-containing layer can be formed.

A thickness of the pressure-sensitive adhesive layer is not particularly limited, and is, for example, 10 μm to 500 μm.

MODIFICATION EXAMPLES

Modification Examples 1 and 2

As shown in FIG. 2, in the water-stop film 100, the water-absorbent polymer-containing layer 20 includes the first water-absorbent polymer-containing layer 20A having a flat shape, on a surface of the water-permeable substrate 10, and includes the second water-absorbent polymer-containing layer 20B having a triangular cross-sectional shape, on a surface of the first water-absorbent polymer-containing layer 20A in this order. However, the cross-sectional shape of the water-absorbent polymer-containing layer is not limited thereto.

For example, as shown in FIG. 3A, in a water-stop film 200, a water-absorbent polymer-containing layer 21 includes a first water-absorbent polymer-containing layer 21A having a flat shape, on a surface of a water-permeable substrate 11, and includes a second water-absorbent polymer-containing layer 21B having a quadrangular cross-sectional shape, on a surface of the first water-absorbent polymer-containing layer 21A in this order.

In addition, for example, as shown in FIG. 3B, in a water-stop film 300, a water-absorbent polymer-containing layer 22 includes a first water-absorbent polymer-containing layer 22A having a flat shape, on a surface of a water-permeable substrate 12, and includes a second water-absorbent polymer-containing layer 22B having a stepped cross-sectional shape in which a width discontinuously decreases in the direction away from the water-permeable substrate 12, on a surface of the first water-absorbent polymer-containing layer 22A in this order.

As described above, it is preferable that the cross-sectional shape of the water-absorbent polymer-containing layer is a tapered shape in which a width decreases in the direction away from the water-permeable substrate. Specifically, the cross-sectional shape of the water-absorbent polymer-containing layer is preferably the form shown in FIG. 2 or FIG. 3B.

Modification Example 3

As shown in FIG. 2, in the water-stop film 100, the pressure-sensitive adhesive layer 30 is provided so as to cover the surfaces of the first water-absorbent polymer-containing layer 20A and the second water-absorbent polymer-containing layer 20B. Similarly, as shown in FIG. 3A, in the water-stop film 200, a pressure-sensitive adhesive layer 31 is provided so as to cover the surfaces of the first water-absorbent polymer-containing layer 21A and the second water-absorbent polymer-containing layer 21B. As shown in FIG. 3B, in the water-stop film 300, a pressure-sensitive adhesive layer 32 is provided so as to cover the surfaces of the first water-absorbent polymer-containing layer 22A and the second water-absorbent polymer-containing layer 22B. However, the disposition form of the pressure-sensitive adhesive layer is not limited thereto.

In addition, as shown in FIG. 3C, in a water-stop film 400, a water-absorbent polymer-containing layer 23 includes a first water-absorbent polymer-containing layer 23A having a flat shape, on a surface of a water-permeable substrate 13, and includes a second water-absorbent polymer-containing layer 23B having a triangular cross-sectional shape, on a surface of the first water-absorbent polymer-containing layer 23A in this order, and a pressure-sensitive adhesive layer 33 is provided so as to cover only the surface of the first water-absorbent polymer-containing layer 23A.

In a case where the water-stop film 400 is used, water can be stopped by inserting the second water-absorbent polymer-containing layer 23B into the gap of the object and pressing the surface of the pressure-sensitive adhesive layer 33 against the periphery of the gap of the object. That is, the pressure-sensitive adhesive layer may be provided on at least a part of the surface of the water-absorbent polymer-containing layer, and may be provided on at least the surface of the first water-absorbent polymer-containing layer.

Modification Example 4

As shown in FIG. 3A, in the water-stop film 200, the water-absorbent polymer-containing layer 21 includes the first water-absorbent polymer-containing layer 21A and the second water-absorbent polymer-containing layer 21B in this order. However, the layer configuration of the water-absorbent polymer-containing layer is not limited thereto.

As shown in FIG. 3D, in a water-stop film 500, a water-absorbent polymer-containing layer 24 consists of only a second water-absorbent polymer-containing layer 24B having a quadrangular cross-sectional shape, and a pressure-sensitive adhesive layer 34 is provided so as to cover a surface of a water-permeable substrate 14 and a surface of the second water-absorbent polymer-containing layer 24B.

EXAMPLES

Hereinafter, Examples according to the present disclosure will be described, but the present disclosure is not limited to Examples below.
<Preparation of Composition 1 for Water-Absorbent Polymer-Containing Layer>
8 parts by mass of aluminum glycinate was added to 600 parts by mass of glycerin, and the mixture was stirred. Next, 100 parts by mass of an acrylic acid/sodium acrylate copolymer (product name "Viscomate NP-700", manufactured by Showa Denko K.K.) was added thereto, and the mixture was stirred. Furthermore, an aqueous solution of tartaric acid (240 parts by mass of purified water and 0.8 parts by mass of tartaric acid) prepared in advance was added thereto, and the mixture was stirred to obtain a composition 1 for a water-absorbent polymer-containing layer.

<Preparation of Composition 2 for Water-Absorbent Polymer-Containing Layer>
2.0 g of polyurethane (trade name "AQUA CALK TWB-P", manufactured by SUMITOMO SEIKA CHEMICALS CO., LTD.) and 0.4 g of a plasticizer (trade name "ADK CIZER RS-1000", manufactured by ADEKA Corporation) were mixed to obtain a composition 2 for a water-absorbent polymer-containing layer.

Example 1

A mold having a quadrangular shape in a cross-sectional view was prepared.

The composition 2 for a water-absorbent polymer-containing layer was poured into the prepared mold using a slot die, a nonwoven fabric (product name "KURASEAL", manufactured by Kuraray Co., Ltd., basis weight: 130 g/m$^2$, elongation rate: 200%) was placed as a water-permeable substrate, and a heating treatment was performed at 150° C. for 60 seconds to form a water-absorbent polymer-containing layer having a quadrangular cross-sectional shape on the nonwoven fabric. A PVA film (manufactured by Kuraray Co., Ltd.) was attached to the nonwoven fabric and the water-absorbent polymer-containing layer to form a pressure-sensitive adhesive layer, thereby obtaining a water-stop film having a cross-sectional shape shown in FIG. 3D. A width of the water-absorbent polymer-containing layer was 20 mm.

Example 2

A mold which was cut out in a flat shape and further cut out in a quadrangular shape in a cross-sectional view along a length direction was prepared.

The composition 2 for a water-absorbent polymer-containing layer was poured into a portion of the prepared mold, having a quadrangular shape in a cross-sectional view, using a slot die, and then a heating treatment was performed at 150° C. for 60 seconds. In addition, the composition 1 for a water-absorbent polymer-containing layer was poured into a flat portion of the prepared mold, a nonwoven fabric (product name "KURASEAL", manufactured by Kuraray Co., Ltd., basis weight: 130 g/m$^2$, elongation rate: 200%) was placed as a water-permeable substrate, and a drying treatment was performed with hot air at 80° C. at 10 m/sec to form a first water-absorbent polymer-containing layer having a flat shape on the nonwoven fabric and a second water-absorbent polymer-containing layer having a quadrangular cross-sectional shape on the surface of the first water-absorbent polymer-containing layer. A PVA film (manufactured by Kuraray Co., Ltd.) was attached to the nonwoven fabric and the water-absorbent polymer-containing layer to form a pressure-sensitive adhesive layer, thereby obtaining a water-stop film having a cross-sectional shape shown in FIG. 3A. A thickness of the first water-absorbent polymer-containing layer was 1.5 mm. A width of the second water-absorbent polymer-containing layer was 20 mm, and a thickness thereof was 20 mm.

Example 3

A mold which was cut out in a flat shape and further cut out in a triangular shape in a cross-sectional view along a length direction was prepared.

A water-stop film having a cross-sectional shape shown in FIG. 2 was obtained by the same method as in Example 2, except that the mold was changed. The maximum width of the second water-absorbent polymer-containing layer was 20 mm, and the thickness thereof was 20 mm.

Example 4

A water-stop film having a cross-sectional shape shown in FIG. 3A was obtained by the same method as in Example 2, except that the water-permeable substrate was changed to a nonwoven fabric (product name "KURASEAL", manufactured by Kuraray Co., Ltd., basis weight: 130 g/m², elongation rate: 300%).

Example 5

A water-stop film having a cross-sectional shape shown in FIG. 3A was obtained by the same method as in Example 2, except that the water-permeable substrate was changed to a nonwoven fabric (product name "KURASEAL", manufactured by Kuraray Co., Ltd., basis weight: 200 g/m², elongation rate: 200%).

Example 6

A water-stop film was obtained by the same method as in Example 2, except that the composition 2 for a water-absorbent polymer-containing layer was poured into the flat portion of the prepared mold.

Comparative Example 1

A mold having a flat shape was prepared.

The composition 1 for a water-absorbent polymer-containing layer was poured into the prepared mold using a slot die, a nonwoven fabric (product name "KURASEAL", manufactured by Kuraray Co., Ltd.) was placed as a water-permeable substrate, and a heating treatment was performed at 150° C. for 60 seconds to form a first water-absorbent polymer-containing layer having a flat shape on the nonwoven fabric. A PVA film (manufactured by Kuraray Co., Ltd.) was attached to the first water-absorbent polymer-containing layer to form a pressure-sensitive adhesive layer, thereby obtaining a water-stop film. A thickness of the first water-absorbent polymer-containing layer was 1.5 mm.

Comparative Example 2

A water-stop film was obtained by the same method as in Example 2, except that the water-permeable substrate was not provided.

Comparative Example 3

A water-stop film was obtained by the same method as in Example 2, except that the pressure-sensitive adhesive layer was not provided.

Durability, workability, and water stopping time were evaluated using the produced water-stop film. The evaluation methods were as follows.

<Durability>

A water tank having a hole with a width of 500 mm and a height of 10 mm in a lower part of a wall surface was used as an experimental water tank (width: 600 mm, height: 700 mm, depth: 20 mm). Water was poured into the experimental water tank to a height of 500 mm. The water-stop film was attached to the inner bottom surface and the inner wall surface of the water tank such that the protruding portion of the water-stop film was positioned at the hole. A moment (that is, a water stop duration) from the time when the water flowing out of the hole was stopped to the time when the water was again flowed out of the hole was measured. The evaluation standard was as follows. As the water stop duration is longer, the durability is more excellent.

A: water stop duration was 72 hours or more.

B: water stop duration was 24 hours or more and less than 72 hours.

C: water stop duration was less than 24 hours.

<Workability>

In order to evaluate the workability, an experimental wall was prepared. The experimental wall was provided with, at a lower part, a U-shaped hole consisting of a horizontal slit having a width of 1800 mm and a height of 10 mm and a vertical slit having a height of 600 mm and a width of 10 mm, which was connected to both ends of a horizontal slit. The water-stop film was attached such that the protruding portion of the water-stop film was positioned at the hole. A time required for construction (that is, a construction time) was measured. The evaluation standard was as follows. As the construction time is shorter, the workability is more excellent.

A: construction time was 3 minutes or less.

B: construction time was more than 3 minutes and 5 minutes or less.

C: construction time was more than 5 minutes.

<Water Stopping Time>

A water tank having a hole with a width of 500 mm and a height of 10 mm in a lower part of a wall surface was used as an experimental water tank (width: 600 mm, height: 700 mm, depth: 20 mm). Water was poured into the experimental water tank to a height of 500 mm. The water-stop film was attached to the inner bottom surface and the inner wall surface of the water tank such that the protruding portion of the water-stop film was positioned at the hole. A time taken for the water to stop flowing out of the hole (that is, a water stopping time) was measured, with the time point at which the water was completely filled in the hole as a start time. The evaluation standard was as follows.

A: water stopping time was 3 hours or less.

B: water stopping time was more than 3 hours and 12 hours or less.

C: water stopping time was more than 12 hours.

The evaluation results are shown in Table 1.

In Table 1, "Expansion rate ratio" indicates the expansion rate of the second water-absorbent polymer-containing layer to the expansion rate of the first water-absorbent polymer-containing layer.

TABLE 1

| | Water-permeable substrate | | First water-absorbent polymer-containing layer Shape | Second water-absorbent polymer-containing layer Cross-sectional shape | Expansion rate ratio | Pressure-sensitive adhesive layer | Evaluation | | |
|---|---|---|---|---|---|---|---|---|---|
| | Basis weight (g/m²) | Elongation rate (%) | | | | | Durability | Workability | Water stopping time |
| Example 1 | 130 | 200 | — | Quadrangular | — | Y | B | B | B |
| Example 2 | 130 | 200 | Flat | Quadrangular | 2 | Y | A | B | A |
| Example 3 | 130 | 200 | Flat | Triangular | 2 | Y | A | A | A |
| Example 4 | 130 | 300 | Flat | Quadrangular | 2 | Y | A | A | A |
| Example 5 | 200 | 200 | Flat | Quadrangular | 2 | Y | A | A | A |
| Example 6 | 130 | 200 | Flat | Quadrangular | 1 | Y | B | A | A |
| Comparative Example 1 | 130 | 200 | Flat | — | — | Y | C | B | C |
| Comparative Example 2 | — | — | Flat | Quadrangular | 2 | Y | C | C | B |
| Comparative Example 3 | 130 | 200 | Flat | Triangular | 2 | — | C | C | B |

As shown in Table 1, in Examples 1 to 6, it was found that, since the water-permeable substrate, the water-absorbent polymer-containing layer, and the pressure-sensitive adhesive layer were provided in this order, and the water-absorbent polymer-containing layer had a cross-sectional shape in which at least a part thereof protruded in a direction away from the water-permeable substrate, the water stop duration was long and the durability was excellent.

On the other hand, in Comparative Example 1, it was found that the water-absorbent polymer-containing layer was flat, and thus the durability was deteriorated.

In Comparative Example 2, it was found that the water-permeable substrate was not provided, and thus the durability was deteriorated.

In Comparative Example 3, it was found that the pressure-sensitive adhesive layer was not provided, and thus the durability was deteriorated.

In addition, in Example 2, since the water-absorbent polymer-containing layer included the first water-absorbent polymer-containing layer having a flat shape and the second water-absorbent polymer-containing layer having a convex cross-sectional shape, the durability was excellent and the water stopping time could also be shortened as compared with Example 1.

In addition, in Example 2, it was found that, since the expansion rate of the second water-absorbent polymer-containing layer was higher than the expansion rate of the first water-absorbent polymer-containing layer, the durability was excellent as compared with Example 1.

In addition, in Example 3, it was found that, since the cross-sectional shape of the water-absorbent polymer-containing layer had a tapered shape in which the width decreased in a direction away from the water-permeable substrate, the workability was excellent as compared with Example 2.

The disclosure of Japanese Patent Application No. 2022-135048 filed on Aug. 26, 2022 is incorporated in the present specification by reference. In addition, all documents, patent applications, and technical standards described in the present specification are incorporated herein by reference to the same extent as in a case of being specifically and individually noted that individual documents, patent applications, and technical standards are incorporated by reference.

What is claimed is:

1. A water-stop film comprising, in the following order:
a water-permeable substrate;
a water-absorbent polymer-containing layer; and
a pressure-sensitive adhesive layer,
wherein the water-absorbent polymer-containing layer has a cross-sectional shape in which at least a part of the water-absorbent polymer-containing layer protrudes in a direction away from the water-permeable substrate.

2. The water-stop film according to claim 1,
wherein the water-absorbent polymer-containing layer includes, in the following order,
a first water-absorbent polymer-containing layer having a flat shape, on a surface of the water-permeable substrate, and
a second water-absorbent polymer-containing layer having a convex cross-sectional shape, on a surface of the first water-absorbent polymer-containing layer.

3. The water-stop film according to claim 2,
wherein an expansion rate of the second water-absorbent polymer-containing layer is higher than an expansion rate of the first water-absorbent polymer-containing layer.

4. The water-stop film according to claim 3,
wherein the expansion rate of the second water-absorbent polymer-containing layer is 1.5 times to 5 times the expansion rate of the first water-absorbent polymer-containing layer.

5. The water-stop film according to claim 1,
wherein the cross-sectional shape of the water-absorbent polymer-containing layer is a tapered shape in which a width decreases in the direction away from the water-permeable substrate.

6. The water-stop film according to claim 1,
wherein an elongation rate of the water-permeable substrate is 100% to 300%.

7. The water-stop film according to claim 1,
wherein a basis weight of the water-permeable substrate is 100 g/m² to 200 g/m².

8. The water-stop film according to claim 1,
wherein the water-permeable substrate is a nonwoven fabric, a cloth, or a paper.

* * * * *